United States Patent [19]
Aseere et al.

[11] Patent Number: 5,359,475
[45] Date of Patent: Oct. 25, 1994

[54] AIR FILTER SYSTEM FOR HELICAL SCANNER DRUM WITH VENTED DRUM COVER

[75] Inventors: Lester M. Aseere, Woodbury; Gerald J. Niles, St. Paul; Robert L. Hanson, East Bethel; Marvin J. Niezgocki, Maplewood, all of Minn.

[73] Assignee: Minnesota Mining and Manufacturing Company, St. Paul, Minn.

[21] Appl. No.: 855,579

[22] Filed: Mar. 23, 1992

[51] Int. Cl.⁵ ............... G11B 5/027; B01D 50/00; B01D 59/50
[52] U.S. Cl. ................ 360/85; 360/84; 360/130.24; 55/385.6; 55/400
[58] Field of Search .......... 360/81, 84, 85, 90, 360/93, 95, 97.01–98.01, 100.1, 102, 103, 104, 107–109, 130.21–130.24; 55/310, 359, 490, 492, 504, 510, 511, 400, 385.6, 316; 210/398, 232, 402–404, 414, 415

[56] References Cited

U.S. PATENT DOCUMENTS

| | | | |
|---|---|---|---|
| 3,404,241 | 10/1968 | Streets et al. | 179/100.2 |
| 3,612,376 | 10/1971 | Johnson | 226/194 |
| 3,624,624 | 11/1971 | Johnson | 360/100.1 |
| 3,691,315 | 9/1972 | Ellmore | 179/100.2 T |
| 3,812,534 | 5/1974 | Rousseau et al. | 360/97.03 |
| 3,902,877 | 9/1975 | Swaim | 55/490 |
| 3,940,791 | 2/1976 | Kayan et al. | 360/95 |
| 3,998,916 | 12/1976 | van Turnhout | 264/22 |
| 4,320,755 | 3/1982 | Flint et al. | 55/359 |
| 4,414,588 | 11/1983 | Hathaway | 360/84 |
| 4,525,757 | 6/1985 | Imanishi et al. | 360/102 |
| 4,657,570 | 4/1987 | Gronholz et al. | 55/511 |
| 4,672,599 | 6/1987 | Geyer et al. | 360/102 |
| 4,751,594 | 6/1988 | Blanks | 360/97.02 |
| 4,764,274 | 8/1988 | Miller | 210/232 |
| 4,764,275 | 8/1988 | Robichaud | 55/504 |
| 4,873,592 | 10/1989 | Dulaff et al. | 360/90 |
| 4,880,536 | 11/1989 | Haraveth et al. | 55/504 |
| 4,916,553 | 4/1990 | Yoshioka et al. | 360/9.1 |
| 4,957,518 | 9/1990 | Brassell | 55/510 |
| 4,977,473 | 12/1990 | Arai et al. | 360/130.24 |
| 4,989,110 | 1/1991 | Zevin et al. | 360/107 |
| 5,003,413 | 3/1991 | Miyazaki | 360/77.14 |
| 5,003,424 | 3/1991 | Grant | 360/130.23 |
| 5,023,548 | 6/1991 | McMorran | 324/212 |
| 5,030,260 | 7/1991 | Beck et al. | 360/97.02 |
| 5,041,937 | 8/1991 | Saito | 360/130.24 |
| 5,057,951 | 10/1991 | Eckerd | 360/97.02 |
| 5,065,261 | 11/1991 | Hughes et al. | 360/70 |
| 5,070,419 | 12/1991 | Kiyonaga | 360/72.2 |
| 5,171,430 | 12/1992 | Beach et al. | 55/490 |
| 5,193,709 | 3/1993 | Brassell | 55/510 |

FOREIGN PATENT DOCUMENTS 2176126 10/1986 United Kingdom ................ 55/310

OTHER PUBLICATIONS

"An Evaluation of Video Head Cleaning and Conditioning", *Advance Technology*, (Supplement to Professional Electronics), vol. III, No. 6, Nov./Dec. 1987.

*Primary Examiner*—Stuart S. Levy
*Assistant Examiner*—Jefferson Evans
*Attorney, Agent, or Firm*—Gary L. Griswold; Walter N. Kirn; David B. Kagan

[57] ABSTRACT

The present invention concerns a filter system for a helical scanner drum of the type having a drum cover provided with an air vent. The filter system includes a replaceable air filter element for entrapping airborne particles when air is drawn through the filter element and means for removably securing the filter element to the drum cover such that the filter element covers the air vent.

24 Claims, 3 Drawing Sheets

AIR FILTER SYSTEM FOR HELICAL SCANNER DRUM WITH VENTED DRUM COVER

FIELD OF THE INVENTION

The present invention relates generally to an apparatus suitable for magnetic recording applications. More specifically, the present invention relates to a helical scanner drum of the type having a drum cover provided with an air vent, wherein the helical scanner drum is fitted with a filter system for filtering air that is drawn into the helical scanner drum through the air vent.

BACKGROUND OF THE INVENTION

Helical scanning has been widely used to magnetically record analog and digital information on magnetic recording tape. In a helical scanning apparatus, the magnetic recording tape is helically wrapped around a helical scanning drum. Typically, a helical scanning drum comprises a drum body and a drum cover. The drum body includes a rotatable drum portion and may also include a stationary drum portion. One or more transducing heads are mounted on the periphery of the rotatable drum portion in a circumferentially spaced relationship. Each transducing head protrudes through a head port and actually pushes into the surface of the magnetic recording tape. The poles of the transducer heads are separated by a microscopic air gap. It is across this gap that the magnetic flux lines, which are representative of the information to be recorded or played back, are either generated or sensed.

During operation, the rotatable drum portion rotates about its longitudinal axis at high speed, e.g., at a speed in the range from 1800 to 3600 rpm. As the rotatable drum portion rotates, a pressurized air film is generated beneath the tape. The air film minimizes friction between the magnetic recording tape and the helical scanning drum. In some helical scanning drums, the drum cover is provided with an air vent disposed in a centered position on the drum cover. One example of an apparatus having a helical scanning drum with a vented drum cover is commercially available as VPR-80 Type "C" helical video recorder from Ampex Corp. Helical scanning drums have been generally described, for example, in U.S. Pat. Nos. 3,404,241; 3,691,315; 4,184,183; 4,414,588; 4,909,110; 4,916,555; 5,003,413; and 5,003,424.

Any contamination of the transducer head or the air film with debris can cause spacing loss between the tape surface and the head gap, preventing the recording or playback of a certain amount of magnetically stored information for a certain period of time. Such a signal loss is referred to as a "dropout". Dropouts have been particularly troublesome in helical scanning drums of the type in which the drum cover is provided with an air vent.

SUMMARY OF THE INVENTION

We have now discovered that the number of dropouts can be substantially reduced by placing a filter over the air vent on the drum cover of a helical scanning drum. Accordingly, in one aspect, the present invention concerns a filter system for a helical scanning drum of the type having a drum cover provided with an air vent. The filter system comprises an air filter element for entrapping airborne particles when air is drawn through the filter element and means for removably securing the filter element to the drum cover such that the filter element covers the air vent.

In preferred embodiments, the filter system comprises (a) a filter housing having a cavity with first and second openings to allow air to pass through the cavity, wherein the filter housing is attached to the drum cover in a position such that the air vent of the drum cover opens into the first opening of the cavity;

(b) a replaceable air filter element for entrapping airborne particles when air is drawn through the filter element, wherein the filter element is positioned in the cavity of the filter housing such that the filter element covers the air vent; and (c) a filter cover attached to the filter housing, wherein the filter cover extends over the second opening of the cavity such that the filter cover traps the filter element in the cavity of the filter housing, wherein the filter cover has a plurality of apertures to allow air to pass through the filter cover, and wherein the filter cover is removable so that the filter element can be lifted out of the cavity for replacement when the filter cover is removed from the filter housing.

In another aspect, the present invention concerns a drum cover for a helical scanning drum of the type in which the drum cover is provided with an air vent, wherein the drum cover is fitted with the filter system of the present invention. In another aspect, the present invention concerns a helical scanning drum of the type having a drum cover provided with an air vent, wherein the helical scanning drum is fitted with a filter system of the present invention.

The present invention is based, in part, upon the discovery that airborne particles drawn through the air vent of a vented drum cover are a major cause of the dropouts that occur when a helical scanning drum having an air vent in the drum cover is used for magnetic recording. In investigating this problem, we removed the vented drum covers on those helical scanning drums for which dropouts were a problem. We observed a great deal of debris inside these helical scanning drums. Laboratory analysis of the debris showed that the debris was coming from the surrounding environment. To determine how so much debris was ending up inside the helical scanning drums, we performed an experiment in which we used smoke and cooking flour to examine air draw and flow through the helical scanning drum during use. The experiment showed that a great volume of air, e.g., 250 to 500 column feet per minute enters the helical scanning drum through the air vent in the drum cover and exits through the apertures on the side of the cover, if any, and the head ports. Any airborne particles carried by the air as the air exits through the head ports may contaminate the air film existing between the tape and drum. By causing spacing loss between the transducer heads and the magnetic tape, this contamination is a major source of dropouts.

DESCRIPTION OF THE PREFERRED EMBODIMENTS

Figure 1:
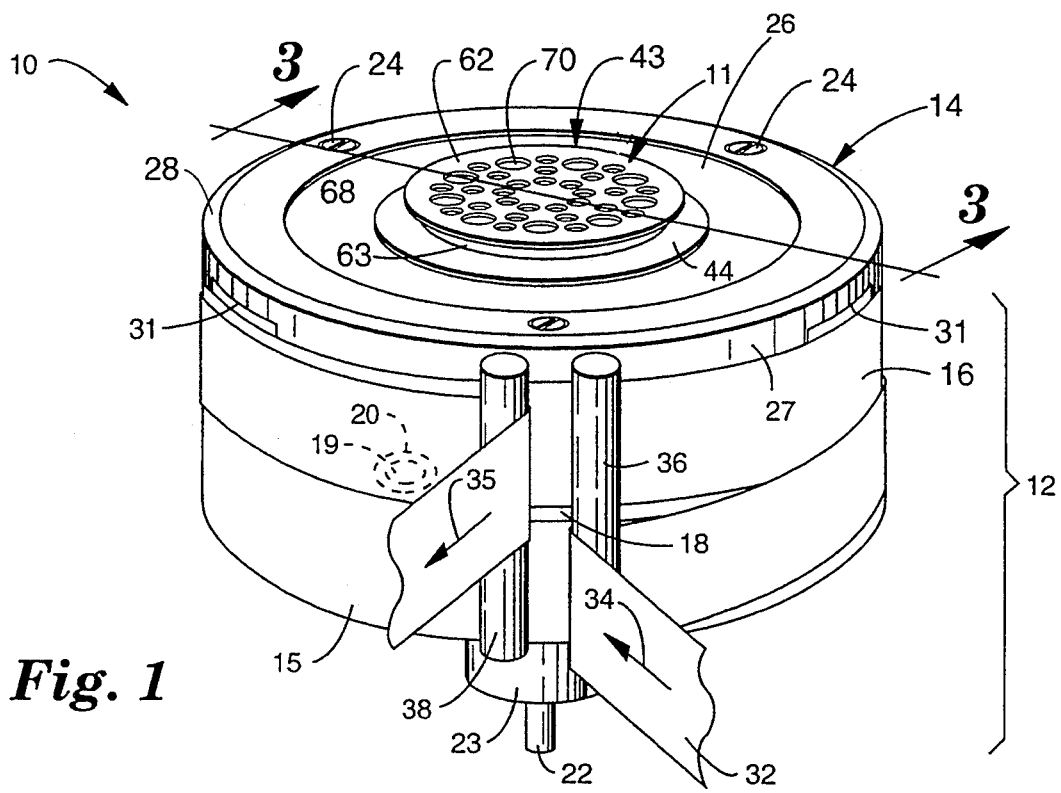
FIG. 1 is a perspective view of a helical scanner drum fitted with a filter system of the present invention.
Figure 2:
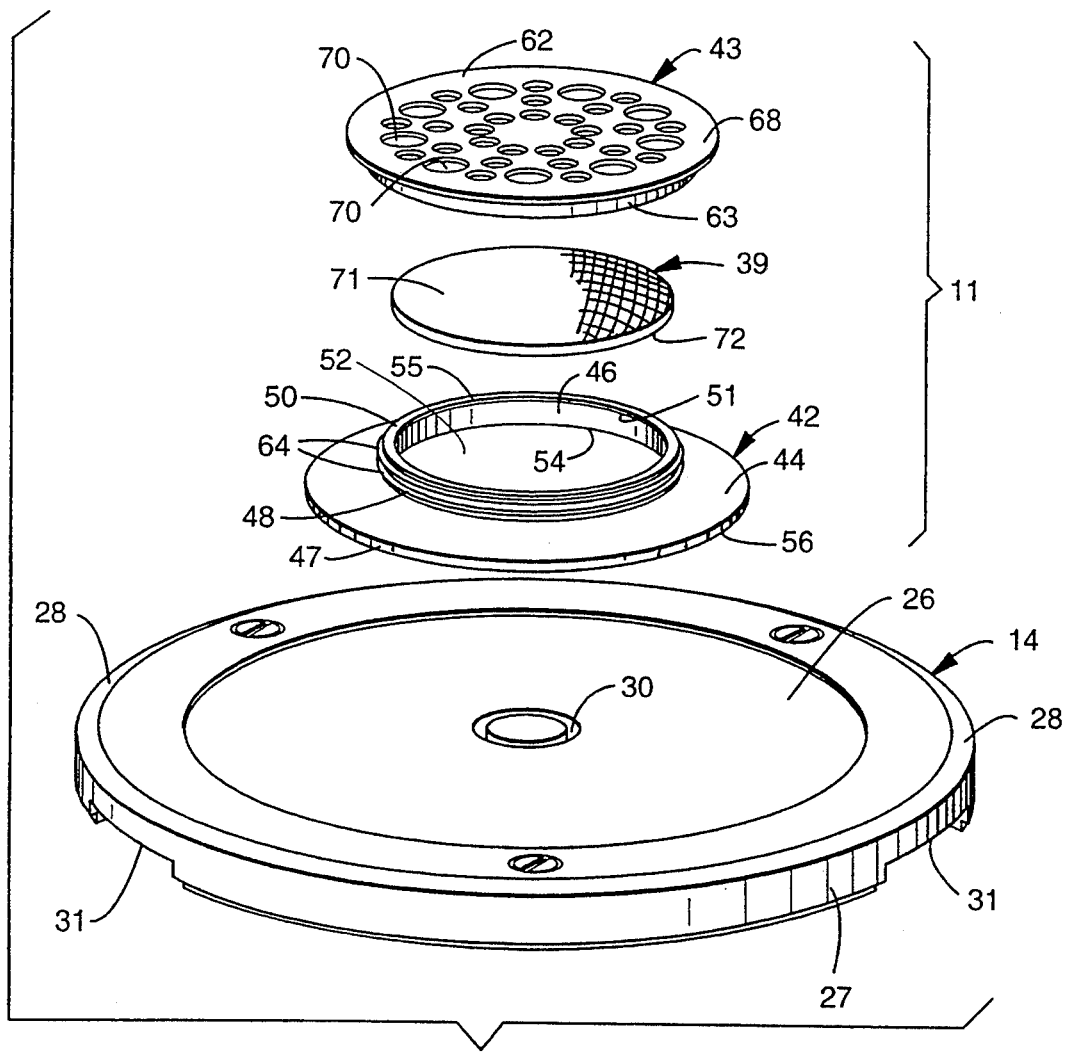
FIG. 2 is an exploded view of a vented drum cover with filter system parts.

Referring first to FIGS. 1 and 2, there is shown one embodiment of a helical scanner drum 10, wherein the scanner drum 10 is fitted with a filter system 11 according to the present invention. The helical scanner drum 10 includes a drum body 12 and a drum cover 14. The drum body 12 includes a stationary lower drum portion 15 and a rotatable upper drum portion 16. The rotatable upper drum portion 16 has substantially the same diameter as the stationary lower drum portion 15. The drum portions 15 and 16 are mounted coaxially and are axially spaced apart to define a gap 18. One or more transducing heads 19 (only one of which is shown in FIG. 1) are mounted on the periphery of the rotatable upper drum portion 16 in a circumferentially spaced relationship. Each transducing head 19 protrudes through a head port 20. The rotatable upper drum portion 16 is fixed to a shaft 22. The shaft 22 is rotatably journaled in a bearing 23 that is mounted on the lower drum portion 15. The shaft 22 is driven by a motor (not shown) operatively connected to the shaft 22 in a conventional manner.

The drum cover 14 is fixed to the rotatable upper drum portion 16 by a plurality of screws 24. The drum cover 14 comprises a drum covering member 26 and a circumferential flange 27 disposed on the outer periphery 28 of the drum covering member 26. The drum covering member 26 is provided with an annular air vent 30 disposed in a centered position on the drum covering member 26. The circumferential flange 27 is provided with apertures 31 that are circumferentially spaced around the flange 27.

In use, a magnetic recording tape 32 advances toward the drum body 12 in the direction indicated by the arrow 34. As the tape 32 advances toward the drum body 12, the tape 32 is fed around a first tape guide 36 which brings the tape 32 into contact with the surface of the stationary lower drum portion 15. The tape 32 then travels helically around the drum body 12 until the tape 32 passes a second tape guide 38. As the tape travels helically around the drum body 12, the tape 32 crosses the gap 18 and contacts the outer surface of the rotatable upper drum portion 16. The second tape guide 38 causes the tape 32 to move away from the drum body in the direction shown by the arrow 35.

During operation, the rotatable upper drum portion 16 rotates about its longitudinal axis at high speed, e.g., at a speed in the range from 1800 to 3600 rpm. As the upper drum portion 16 rotates, a pressurized air film is generated beneath the tape 32. The air film is vented to a degree by the gap 18. As the upper drum portion 16 rotates, a substantial volume of air is also drawn into the drum body 12 through the air vent 30. The air then flows out of the drum body 12 through the apertures 31 and the head port 20.

Although the filter system 11 of the present invention is described with reference to the specific helical scanner drum 10 illustrated in FIGS. 1 and 2, this specific helical scanner drum is exemplary only. The filter system 11 of the present invention may be advantageously used with any kind of helical scanning drum whose cover is provided with an air vent such as the air vent 30.

Figure 3:
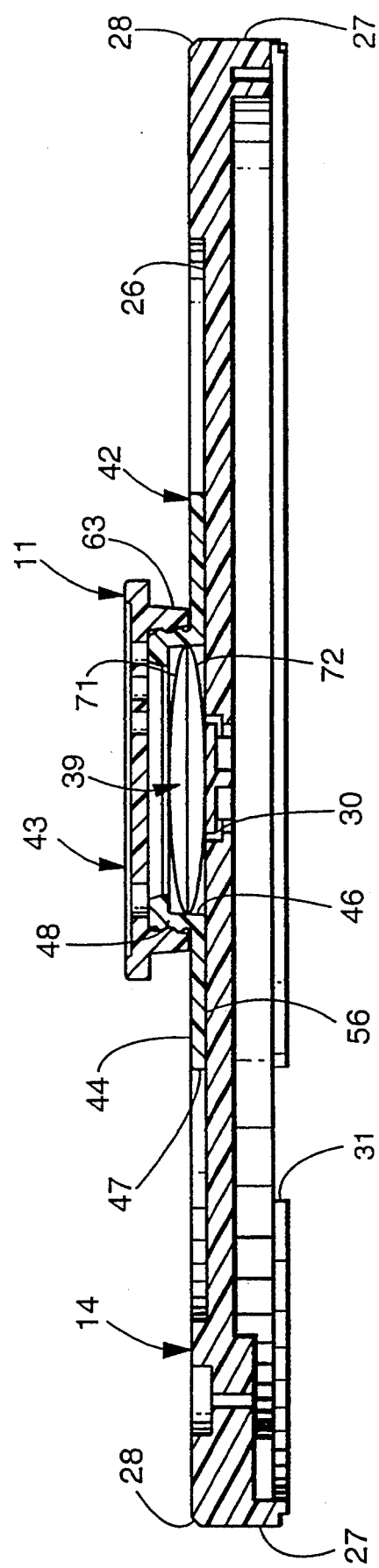
FIG. 3 is a cross-section of a vented drum cover fitted with a filter system of the present invention taken along line 3—3 of FIG. 1.

As best shown in FIGS. 2 and 3, the filter system 11 of the present invention preferably comprises a replaceable air filter element 39 and means for removably securing the filter element 39 to the drum cover 14 such that the filter element 39 covers the air vent 30. Thus, air that is drawn through the air vent 30 must also pass through the filter element 39. In this way, the filter element 39 entraps a substantial portion of airborne particles as air is drawn through the air vent 30 into the helical scanner drum 10.

Referring now to FIGS. 1-4, preferred means for removably securing the filter element 39 to the drum cover 14 comprises a filter housing 42 and an optional filter cover 43. The filter housing 42 includes an annular base portion 44 having an inner rim 46 and an outer rim 47. The filter housing 42 also includes a cylindrical housing flange 48 attached to and extending upward from the base portion 44. The location of the housing flange 48 on the base portion 44 is not critical, and the housing flange 48 can be located anywhere on the base portion 44. For example, the housing flange 48 can be positioned at the outer rim 47, the inner rim 46, or anywhere in between. As best seen in FIG. 2, it is most preferred that the housing flange 48 is positioned at the inner rim 46 of the annular base portion 44. Although the annular base portion 44 and the housing flange 48 may be separately made and then attached to each other, it is preferred that the housing flange 48 is integral with the annular base portion 44.

Figure 4:
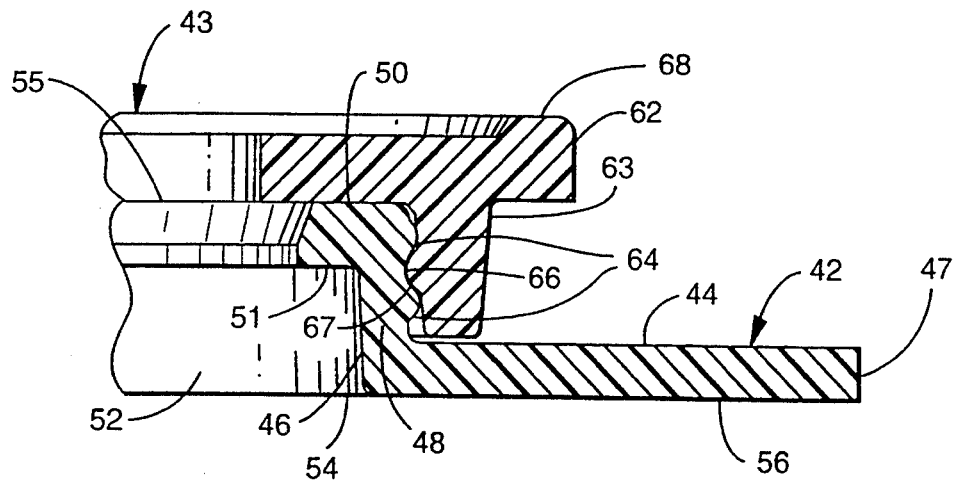
FIG. 4 is an enlarged, partial cross-section of a filter system of the present invention showing the filter housing and the filter cover, wherein the filters element is not shown.

As seen best in FIG. 4, the top rim 50 of the housing flange 48 may have a ledge member 51 extending radially inward from the top rim 50 toward the center of the housing flange 48. The ledge member 51 may extend around only a portion or portions of the top rim 50. Preferably, the ledge member 51 extends around the entire circumference of the top rim 50. The ledge member 51 helps support the filter cover 43 and helps to hold the filter element 39 against the air vent 30. When the rotatable upper drum portion 16 rotates, air pressure, the housing flange 48, and the ledge member 51 hold the filter element 39 over the air vent 30 and against drum covering member 26.

Referring again to FIGS. 1-4, the housing flange 48 defines a cylindrically-shaped cavity 52 with a first opening 54 and a second opening 55 that allow air to pass through the cavity 52. The filter housing 42 is attached to the drum cover 14 such that the underside 56 of the annular base portion 44 is proximal to the drum covering number 26. The filter housing 42 is attached to the drum cover 14 in a position such that the air vent 30 opens into the first opening 54 of the cavity 52. Preferably, the filter housing 42 is centered over the air vent 30. When the filter housing 42 is centered over the air vent 30, the mass of the filter housing 42 is centered about the rotational axis of the rotatable upper drum portion 16. Thus centered, the filter housing 42 shows less of a tendency to cause wobbling of the helical scanner drum 10 as the rotatable upper drum portion 16 rotates at high speed.

The filter housing 42 may be attached to the drum cover 14 in a variety of ways. For example, the filter housing 42 may be adhered to the drum cover 14 using an adhesive such as a pressure sensitive adhesive, a hot-melt adhesive, an isocyanate adhesive, a solvent bond adhesive, and the like. The filter housing 42 can also be screwed, bolted, or taped to the drum cover 14.

As another alternative, the filter housing 42 can be integral with the drum cover 14. Preferably, the filter housing 42 is attached to the drum cover 14 using a pressure sensitive adhesive commercially available as 3M No. 467 High Performance Adhesive from Minnesota Mining and Manufacturing Company.

The replaceable air filter element 39 is positioned in the cavity 52 of the filter housing 42 such that the filter element 39 covers the air vent 30. It is preferred that the filter element 39 is held by the filter housing 42 in a centered position over the air vent 30. Preferably, the filter element 39 has a shape and size corresponding to the shape and size of the cavity 52. For example, in FIGS. 1-4 in which a cylindrically-shaped cavity 52 is shown, it is preferred that the filter element 39 also has a cylindrical shape of a sufficient size such that the filter element 39 substantially fills the cavity 52.

The cross-sectional area of the filter element 39 when viewed along the rotational axis of the rotatable upper drum portion 16 may be any convenient size so long as the filter element 39 substantially covers the air vent 30. Preferably, however, the cross-sectional area of the filter element 39 is larger than the cross-sectional area of the air vent 30. For example, in the preferred embodiment shown in FIGS. 1-4 in which both the filter element 39 and the air vent 30 have circular cross-sections when viewed along the rotational axis of the rotatable upper drum portion 16, using a filter element 39 with a diameter that is twice as large as the outer diameter of the air vent 30 has been found to be suitable in the practice of the present invention.

The filter element 39 is used to entrap airborne particles in air that is drawn through the air vent 30. Airborne particles include debris such as clothing fibers, skin flakes, hair, paper and cardboard dust, carpet fibers, construction particles, cigarette ash, and the like. We have now discovered that such airborne particles are drawn through the air vent 30 by a strong suction force as the rotatable upper drum portion 16 rotates and then exit through the apertures 31 and the head port 20. Particles exiting the helical scanner drum 10 through the head port 20 contaminate the air film between the magnetic recording tape 32 and the drum body 12. Our experiments have shown that such contamination causes dropouts to occur as information is magnetically stored on a magnetic recording tape.

A preferred filter element of the present invention may be formed from an air filter media commercially available as 3M Filtrete brand air filter media No. G-0110 (100 g/m$^2$) from Minnesota Mining and Manufacturing Company, St. Paul, Minnesota. This material comprises an electrically charged, fibrous filtering matrix interposed between two heat-sealable, air-transmissive outer cover sheets. Preferably, the outer cover sheets are formed from spun-bonded polypropylene. 3M Filtrete brand air filter media is available in large sheets which may be cut with a heated die to an appropriate size and shape to fit within the cavity 52. When the resulting filter element is placed in the cavity 52, one of the cover sheets is proximal to the air vent 30, and the other cover sheet is proximal to the second opening 55 of the cavity 52. Electrically charged, fibrous filtering media have been described in U.S. Reissue Pat. No. 31,285.

An optional filter cover 43 is attached to the filter housing 42. The filter cover 43 extends over the second opening 55 of the cavity 52 of the filter housing 42 such that the filter cover 43 traps the filter element 39 in the cavity 52. The filter cover 43 includes a covering member 62 and a cylindrical cover flange 63 attached to and extending downward from the covering member 62. Although the covering member 62 and cover flange 63 may be separately made and then attached to each other, it is preferred that the cover flange 63 is integral with the covering member 62. The filter cover 43 is removable so that the filter element 39 can be lifted out of the cavity 52 for replacement when the filter cover 43 is removed from the filter housing 42.

The filter cover 43 may be removably attached to the filter housing 42 in a variety of ways. According to one preferred technique, the cover flange 63 and the housing flange 48 may be adapted for snap-fit engagement with each other. This technique is best illustrated in FIG. 4. As seen in FIG. 4, a pair of circumferential ribs 64 are positioned on the outside surface of the housing flange 48. The ribs 64 define a rib groove 66. A corresponding circumferential rib 67 is positioned on the inside surface of the cover flange 63. When the filter cover 43 is pressed onto the filter housing 42 using finger pressure, the circumferential rib 67 snaps into the groove 66 to hold the filter cover 43 onto the filter housing 42.

To facilitate removal of the filter cover 43 from the filter housing 42, the diameter of the covering member 62 is larger than the outer diameter of the cover flange 63. In this way, a portion 68 of the covering member 62 extends radially outward beyond the outer circumference of the cover flange 63. Simple finger pressure pressing upward against the outward portion 68 allows the filter cover 43 to be easily removed from the filter housing 42.

As another alternative for removably attaching the filter cover 43 to the filter housing 42, the housing flange 48 and the cover flange 63 can be configured to threadably engage each other. When the housing flange 48 and the cover flange 63 are adapted to threadably engage one another, it is desirable that the direction that the cover 43 is rotated for removal is opposite to the direction that the helical scanner drum 10 rotates. In this way, the filter cover 43 would be self-locking. As another alternative for removably attaching the filter cover 43 to the filter housing 42, the housing flange 48 and the cover flange 63 can be adapted for an interference fit with each other. In an interference fit, the cover flange 63 frictionally engages the housing flange 48.

The filter cover 43 has a plurality of apertures 70 positioned radially inward from the cover flange 63 to allow air to pass through the filter cover 43. It is preferred that a portion of the apertures 70 are superposed over the air vent 30 when the filter cover 43 is attached to the filter housing 42, and that a portion of the apertures 70 are offset from the air vent 30 when the filter cover 43 is attached to the filter housing 42. In an alternative embodiment, the filter cover 43 may be louvered to allow air to pass through the filter cover 43.

Although each of the annular base portion 44, the housing flange 48, the covering member 62, and the cover flange 63 shown in FIGS. 1-4 has a circular cross-section when viewed along the rotational axis of the rotatable upper drum portion 16, such a cross-section is only one of many geometric cross-sections within the scope of the present invention. For example, the base portion 44, the housing flange 48, the covering member 62, and/or the cover flange 63 may be triangular, square, oval, pentagonal, hexagonal, octagonal, or the like.

It is desirable that the filter system 11 of FIGS. 1–4 is substantially the same color as the color of the drum cover 14. Such color coordination provides a filter system 11 that is less obtrusive, and a professional, high-tech appearance is maintained. For example, if the drum cover 14 is black in color, then it is preferred that the housing flange 42, the drum cover 43, and the top surface 71 of the filter element 39 also be black in color. However, even if the top surface 71 of the filter element 39 is modified so as to have substantially the same color as the color of the drum cover 14, it is preferred that the bottom surface 72 of the filter element 39 is white in color. In this way, the bottom surface 72 of the filter element 39 can be readily examined to determine whether the filter element 39 has become dirty enough for replacement.

The filter housing 42 and the filter cover 43 may be formed from any material characterized by light weight, good durability, and resilience. For example, metals or polymers may be used for forming the filter housing 42 and the filter cover 43. Preferred polymeric materials suitable for forming the filter housing 42 and the filter cover 43 include acrylonitrile-butadiene-styrene copolymers, acetal resins, polyesters, polystyrenes, polycarbonates, polypropylenes, polyethylenes, polyurethanes, epoxy resins, phenolic resins, styrene-acrylonitrile copolymers, styrene-butadiene copolymers, and the like.

Figure 5:
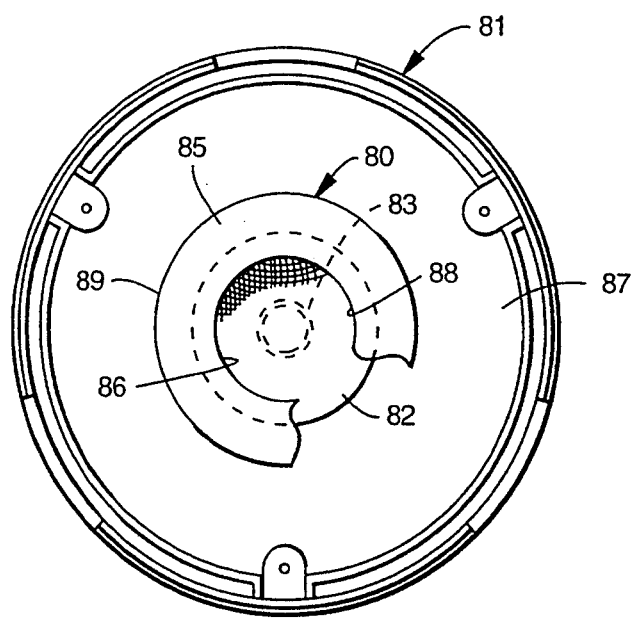
FIG. 5 is a bottom view of an alternative embodiment of a drum cover fitted with a filter system of the present invention.

An alternative embodiment of the present invention is shown in FIG. 5. In this alternative embodiment of the present invention, a filter system 80 is fitted to the inner surface 87 of a drum cover 81 provided with an air vent 83. The filter system 80 includes a filter element 82 and means for removably securing the filter element 82 to the drum cover 81 in a position over the air vent 83. The means for removably securing the filter element to the drum cover 81 in a position over the air vent 83 comprises an annular adhesive tape 85 having a central aperture 86, an inner periphery 88, and an outer periphery 89. The inner portion of the annular adhesive tape 85 proximal to the inner periphery 88 is adhered to the filter element 82, and the outer portion of the annular adhesive tape 85 proximal to the outer periphery 89 is adhered to the inner surface 87 of the drum cover 81. In this way, the central aperture 86 is superposed over the air vent 83.

In another embodiment of the present invention, the filter element may be adhered to a drum cover having an air vent using a double-sided adhesive tape having first and second adhering surfaces. The double-sided adhesive tape is interposed between the filter element and the drum cover in a manner such that one adhering surface is adhered to the drum cover, and the other adhering surface is adhered to the filter element. For example, one adhering surface of a double-sided adhesive tape having an annular shape with a central aperture is adhered to the surface of a vented drum cover such that the air vent opens into the central aperture. The filter element is then adhered to the remaining adhering surface of the double-sided adhesive tape such that the filter element covers the air vent.

In practical tests, the ability of the present invention to reduce dropouts was demonstrated using a helical scanning drum whose cover was provided with an annular-shaped air vent. Prior to fitting a filter system of the present invention to the helical scanning drum, the helical scanning drum was used to record a color black signal on 6698 minutes of magnetic recording tape (151 rolls). During recording, the output RF ("RF" means radio frequency) from the confidence head was fed to an outboard dropout counter. The dropout counter measured small dropouts (5 microsecond/16 db) and large dropouts (50 microsecond/16 db). On the average, 7.7 small dropouts per minute and 27 minutes between large dropouts were observed. The helical scanner drum was then fitted with a filter system of the present invention, and the testing was repeated on 3216 minutes of magnetic recording tape (60 rolls). The filter element was formed from 3M Filtrete brand air filter media No. G-0110. After installation of the filter system, dropouts decreased dramatically. On the average, 4.7 small dropouts per minute (a 40% reduction) and 123 minutes between large dropouts (an 80% reduction) were observed.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A helical scanner drum of the type having a drum cover provided with an air vent, wherein the helical scanner drum is fitted with a filter system which comprises:

(a) a replaceable air filter element for entrapping airborne particles when air is drawn through the filter element; and (b) means for removably securing the filter element to the drum cover such that the filter element covers the air vent, wherein means for removably securing the filter element to the drum cover comprises a filter housing having a cavity with first and second openings to allow air to pass through the cavity, wherein the filter housing is attached to the drum cover in a position such that the air vent of the drum cover opens into the first opening of the cavity, and wherein the replaceable air filter element is retained in the cavity of the filter housing such that the filter element covers the air vent.

2. The combination of claim 1, wherein means for removably securing the filter element to the drum cover further comprises a filter cover attached to the filter housing, wherein the filter cover extends over the second opening of the cavity such that the filter cover traps the filter element in the cavity of the filter housing, wherein the filter cover has a plurality of apertures to allow air to pass through the filter cover, and wherein the filter cover is removable so that the filter element can be lifted out of the cavity for replacement when the filter cover is removed from the filter housing.

3. The combination of claim 2, wherein the filter cover threadably engages the filter housing.

4. The combination of claim 2, wherein the filter cover is adapted for snap-fit engagement with the filter housing.

5. The combination of claim 2, wherein the filter cover is adapted for interference engagement with the filter housing.

6. The combination of claim 2, wherein a portion of the apertures of the filter cover are superposed over the air vent when the filter cover is attached to the filter housing, and a portion of the apertures of the filter cover are offset from the air vent when the filter cover is attached to the filter housing.

7. The combination of claim 2, wherein:
the filter housing comprises an annular base portion and a cylindrical housing flange attached to the inner periphery of the annular base portion and extending upward from the annular base portion,
the cavity has a cylindrical shape defined by the housing flange;
the filter element has a cylindrical shape corresponding to the cylindrically-shaped cavity; and
the filter cover comprises a circular covering member and a cylindrical cover flange attached to and extending downward from the circular covering member, wherein the housing flange and the cover flange are adapted for removable engagement with each other, and wherein the circular covering member has a plurality of apertures positioned radially inward from the cover flange.

8. The combination of claim 7, wherein the diameter of the circular covering member is larger than the outer diameter of the cover flange such that the outer periphery of the circular covering member projects radially outward beyond the cover flange.

9. The combination of claim 7, further comprising a ledge projecting radially inward from the top of the housing flange into the cavity of the filter housing.

10. The combination of claim 1, wherein the filter housing is integral with the drum cover.

11. The combination of claim 1, wherein the filter element comprises an electrically charged fibrous filtering matrix interposed between first and second air-transmissive outer cover sheets, wherein the first outer cover sheet is proximal to the air vent when the filter element is retained in the cavity of the filter housing, and wherein the second outer cover sheet is proximal to the second opening of the cavity when the filter element is retained in the cavity of the filter housing.

12. The combination of claim 11, wherein the second outer cover sheet has a color that is substantially the same as the color of the drum cover, and wherein the first outer cover sheet is white in color.

13. A drum cover for a helical scanner drum of the type in which the drum cover is provided with an air vent, wherein the drum cover is fitted with a filter system which comprises:
(a) an air filter element for entrapping airborne particles when air is drawn through the filter element; and
(b) means for removably securing the filter element to the drum cover such that the filter element covers the air vent, wherein means for removably securing the filter element to the drum cover comprises a filter housing having a cavity with first and second openings to allow air to pass through the cavity, wherein the filter housing is attached to the drum cover in a position such that the air vent of the drum cover opens into the first opening of the cavity, wherein the replaceable air filter element is retained in the cavity of the filter housing such that the filter element covers the air vent.

14. The combination of claim 13, wherein the means for removably securing the filter element to the drum cover further comprises a filter cover attached to the filter housing, wherein the filter cover extends over the second opening of the cavity such that the filter cover traps the filter element in the cavity of the filter housing, wherein the filter cover has a plurality of apertures to allow air to pass through the filter cover, and wherein the filter cover is removable so that the filter element can be lifted out of the cavity for replacement when the filter cover is removed from the filter housing.

15. The combination of claim 14, wherein the filter cover threadably engages the filter housing.

16. The combination of claim 14, wherein the filter cover is adapted for snap-fit engagement with the filter housing.

17. The combination of claim 14, wherein the filter cover is adapted for interference engagement with the filter housing.

18. The combination of claim 14, wherein a portion of the apertures of the filter cover are superposed over the air vent when the filter cover is attached to the filter housing, and a portion of the apertures of the filter cover are offset from the air vent when the filter cover is attached to the filter housing.

19. The combination of claim 14, wherein:
the filter housing comprises an annular base portion and a cylindrical housing flange attached to the inner periphery of the annular base portion and extending upward from the annular base portion,
the cavity has a cylindrical shape defined by the housing flange;
the filter element has a cylindrical shape corresponding to the cylindrically-shaped cavity; and
the filter cover comprises a circular covering member and a cylindrical cover flange attached to and extending downward from the circular covering member, wherein the housing flange and the cover flange are adapted for removable engagement with each other, and wherein the circular covering member has a plurality of apertures positioned radially inward from the cover flange.

20. The combination of claim 19, wherein the diameter of the circular covering member is larger than the outer diameter of the cover flange such that the outer periphery of the circular covering member projects radially outward beyond the cover flange.

21. The combination of claim 19, further comprising a ledge member projecting radially inward from the top of the housing flange into the cavity of the filter housing.

22. The combination of claim 13, wherein the filter housing is integral with the drum cover.

23. The combination of claim 13, wherein the filter element comprises an electrically charged fibrous filtering matrix interposed between first and second air-transmissive outer cover sheets, wherein the first outer cover sheet is proximal to the air vent when the filter element is retained in the cavity of the filter housing, and wherein the second outer cover sheet is proximal to the second opening of the cavity when the filter element is retained in the cavity of the filter housing.

24. The combination of claim 23, wherein the second outer cover sheet has a color that is substantially the same as the color of the drum cover, and wherein the first outer cover sheet is white in color.

* * * * *

UNITED STATES PATENT AND TRADEMARK OFFICE
CERTIFICATE OF CORRECTION

PATENT NO. : 5,359,475
DATED : October 25, 1994
INVENTOR(S) : Aseere et al.

It is certified that error appears in the above-indentified patent and that said Letters Patent is hereby corrected as shown below:

Col. 3, line 1, "filters" should be --filter--.

Col. 3, line 51, "drum body in" should be --drum body 12 in--.

Signed and Sealed this

Fourth Day of April, 1995

Attest:

BRUCE LEHMAN

Attesting Officer     Commissioner of Patents and Trademarks